United States Patent [19]

Cline

[11] Patent Number: 4,673,608

[45] Date of Patent: Jun. 16, 1987

[54] BOOK PANEL CONSTRUCTION

[75] Inventor: Thomas L. Cline, Hanover, Pa.

[73] Assignee: Corra-Board Products Co., Hanover, Pa.

[21] Appl. No.: 897,255

[22] Filed: Aug. 18, 1986

[51] Int. Cl.[4] .............................................. B32B 3/12
[52] U.S. Cl. .................................... 428/182; 428/212; 281/15 R; 150/52 R
[58] Field of Search ...................... 428/182, 186, 212; 281/15 R; 206/450; 150/52 R

[56] References Cited

U.S. PATENT DOCUMENTS 2,148,176  2/1939  Schroeder ........................... 428/182

Primary Examiner—Alexander S. Thomas
Attorney, Agent, or Firm—Daniel J. O'Connor

[57] ABSTRACT

This invention relates generally to a book panel having a particular novel layered construction. In place of a conventional solid chipboard laminated construction, an undulated midstratum layer is utilized in such manner that air cells or pockets are formed within the structure. An overlayer and an underlayer are adhesively applied to the undulated midstratum layer. The invention results in a book panel which may be much more economically manufactured while yielding superior end product strength and durability.

4 Claims, 3 Drawing Figures

BOOK PANEL CONSTRUCTION

BACKGROUND AND OBJECTS OF THE INVENTION

As is known in the book panel and bookbinding industry, hardcover books 10 generally have a solid front panel 20 and a solid rear panel 21 with a flexible middle binding section 25 as shown in FIG. 1.

The front and rear panel portions 20 and 21 typically are formed of a multi-layered solid laminated chipboard as shown in the prior art drawing of FIG. 2B.

The laminated solid chipboard structures of the prior art typically comprise five or more layers, three of which are shown at 31, 32 and 33 of FIG. 2B. Each layer must be fully joined to an adjacent layer by adhesives 35 as is known in the art.

Chipboard is a term known to those of skill in the art to signify paper products processed from, for example, waste paper materials and thus having relatively short fiber lengths contained therein as shown at numerals 40 in the prior art showing at FIG. 2B.

Because chipboard is, by definition, formed of short fiber length materials, it inherently has low original position memory. That is, once bent, chipboard is unable to successfully return to its original desired flat position. Because of such low memory by chipboard products, it has been required to utilize five or more chipboard layers in the formation of a book panel. The required usage of such a high number of chipboard layers has increased adhesives costs and manufacturing time and materials costs generally.

Accordingly, it is an object of the present invention to provide a book panel structure which is less costly to manufacture and ship than the conventionally used laminated solid chipboard design.

It is a further object to reduce manufacturing costs by effectively using air cells within the book panel assembly to reduce overall materials costs.

It is a still further object of the invention to significantly reduce the cost of adhesives used in the production of book panels.

It is a further object to demonstrate a book panel construction which can be bent without the cracking inherent in prior art designs.

It is a still further object to provide a book panel construction which has a higher original position memory than has been heretofore known in the art.

It is a further significant object of the present invention to produce a book panel having the same or increased thickness as prior art designs while decreasing panel weight and improving panel durability.

It is also an object of the invention to demonstrate an advantageous book panel construction which utilizes an undulated midstratum layer having significantly longer average fiber lengths relative to an overlayer and underlayer which are formed of chipboard materials having significantly shorter average fiber lengths therein.

Further objects and advantages of the present invention will become apparent as the following description proceeds, and the features of novelty characterizing the invention will be pointed out with particularity.

PRIOR ART PATENTS

The most relevant prior art patents presently known to the inventor herein are listed as follows: U.S. Pat. No. 1,868,029 issued to Steinthal; U.S. Pat. No. 1,878,813 issued to Block; U.S. Pat. No. 2,120,818 issued to Steinthal; U.S. Pat. No. 2,239,145 issued to Doner; and U.S. Pat. No. 4,129,212 issued to Hopkins.

The U.S. Pat. No. 2,120,818 in particular discusses that a book panel 8 may be fabricated of sheets of paperboard which corresponds to applicant's prior art showing at FIG. 2B. The Hopkins U.S. Pat. No. 4,129,212 suggests the use of plastic book panels but refers to prior art designs wherein multiple flat layers of pressboard or chipboard may be suitably used, again corresponding to applicant's prior art showing at FIG. 2B.

Numerous textbooks related to the art of papermaking describe various paper laminating machines and processes and the significance of paper fiber lengths relative to the overall paper strength. However, applicant's unique design described herein, especially as applied to the specific art of book panel construction, has not been shown or suggested in the prior art.

BRIEF DESCRIPTION OF THE DRAWING FIGURES

DESCRIPTION OF THE PREFERRED EMBODIMENT

Figure 1:
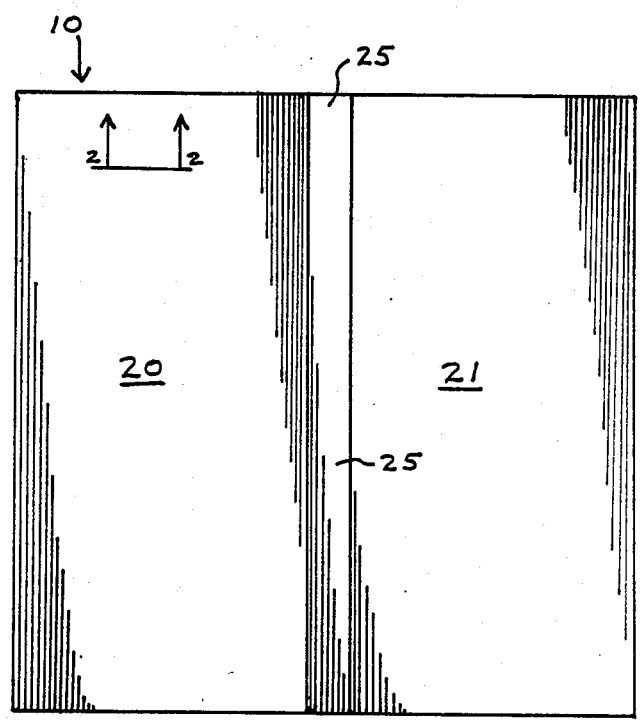
FIG. 1 is a plan view of the book panel structure generally used in the bookbinding industry.
Figure 2A:
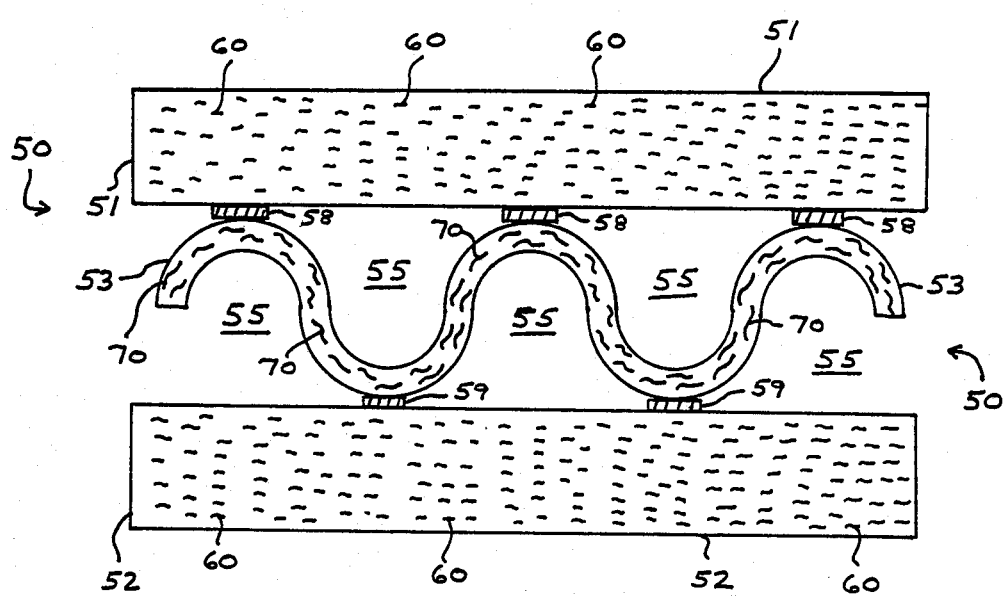
FIG. 2A is a view along lines 2—2 of FIG. 1 illustrating the construction details of the present invention.

As shown in FIG. 2A, the book panel construction of the present invention comprises an overlayer 51 of chipboard having relatively shorter fiber lengths 60 contained therein. Underlayer 52 also comprises chipboard material with corresponding shorter fiber lengths 60.

FIG. 2A further illustrates an undulated midstratum layer 53 wherein the upper undulation portions are bonded by adhesive 58 to overlayer 51. Similarly, the lower undulation portions are bonded by adhesive shown at 59.

In the preferred embodiment of FIG. 2A, the undulated midstratum layer 53 is further shown as being comprised of a paperboard material having relatively longer fiber lengths 70 as compared to the shorter fiber lengths 60 shown in the overlayer 51 and the underlayer 52.

Figure 2B:
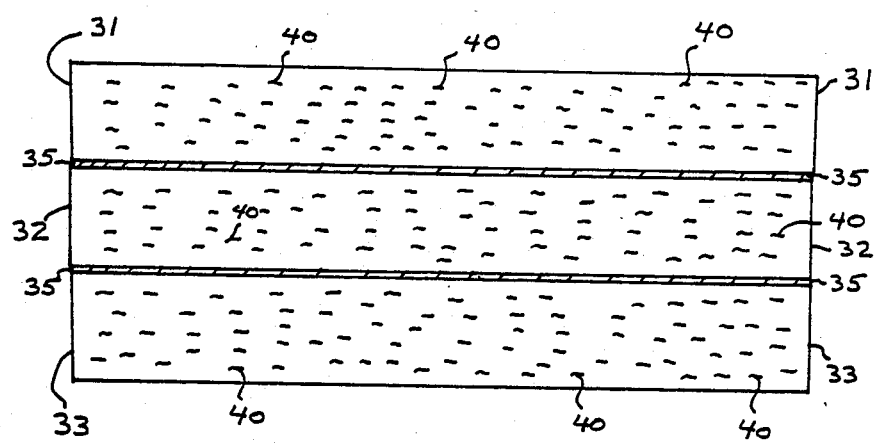
FIG. 2B is a view, similar to FIG. 2A, which illustrates the prior art solid laminated chipboard construction currently used for book panels.

By reason of the construction of FIG. 2A, it is seen that air cells or spaces 55 are formed internally of the book panel structure thus reducing the materials cost in the overall manufacture of the present design. In effect, air spaces are used in place of the chipboard product. It is also apparent that the amount of adhesives 58, 59 required by the inventor's design is greatly reduced as compared to the adhesive requirements shown at 35 of prior art FIG. 2B.

While very significantly reducing manufacturing costs, the inventor herein has also discovered that a superior endproduct is produced. The longer fiber length 70 materials used in the undulating midstratum layer result in a greater original position memory for the overall structure—i.e. it tends to spring back to its original desired flat position if bent as contrasted to the low memory solid chipboard (FIG. 2B) which tends to crack if bent from its desired flat position.

The undulated shape of the midstratum layer also produces a spring-like effect for the overall book panel 50 so that it is more resilient when subject to bending or other potentially destructive usages.

From the foregoing, it will be appreciated by those of skill in the art that the present invention greatly reduces materials costs and product production time. The weight of the end product book panel is significantly reduced thus reducing shipping costs. A thick and durable book panel structure is achieved by substituting air spaces and an undulated midstratum layer for the more costly chipboard.

It is further highly significant that, relative to the prior art, the caliper or thickness of a panel may be increased without adding weight to the unit by reason of the air cell structure of the present invention.

As will be appreciated, a ½-inch thick panel formed utilizing the principles of the invention herein weighs significantly less than a solid ½-inch chipboard panel, thus reducing shipping weight and cost while increasing product durability.

Finally, the product is more resilient and less susceptible to the cracking problems inherent in the prior art solid laminated chipboard designs.

In practice of the invention, it is contemplated that the fibers 60 shown in the over and under chipboard layers 51 and 52 would have an average fiber length of 2mm or less. It is further contemplated that the fibers 70 in the undulating midstratum layer 53 would have an average fiber length of at least 5 mm or more with the possibility of ranging up to 25 mm or more if a higher quality kraft process paper is utilized as the midstratum layer 53.

It is again emphasized that overall product weight and cost are reduced by reason of the air cells 55 which reduce the number of chipboard layers required in a book panel construction. Simultaneously, the durability of the overall book panel 50 is dramatically increased by reason of the undulating midstratum layer 53 and the relatively longer fiber lengths 70 contained therein which, as has been noted, improve the original position memory of the overall panel 50.

While there has been illustrated and described what is at present considered to be a preferred embodiment of the present invention, it will be appreciated that numerous changes and modifications are likely to occur to those skilled in the art, and it is intended herein to cover all those changes and modifications which fall within the true spirit and scope of the present invention.

I claim:

1. In combination with hardcover book structure (10) having a solid front panel (20), a solid rear panel (21) and a flexible middle binding section (25),
   a book panel structure (50) having an overlayer (51) comprised of chipboard material having relatively shorter fiber lengths (60) contained therein,
   said book panel structure having an underlayer (52) comprised of chipboard material having relatively shorter fiber lengths (60) contained therein,
   said book panel structure further having an undulating midstratum layer (53) between said overlayer (51) and underlayer (52),
   wherein the upper undulation portions of said midstratum layer (53) are secured to said overlayer (51) by adhesive means (58),
   and wherein the lower undulation portions of said midstratum layer (53) are secured to said underlayer (52) by adhesive means (59),
   said book panel structure providing means wherein air cells (55) are formed internally thereof such that a given book panel caliper or thickness may be maintained while reducing the number of chipboard layers required for construction,
   wherein said undulating midstratum layer (53) has relatively longer fiber lengths (70) contained therein as compared to the relatively shorter fiber lengths (60) contained in said overlayer (51) and said underlayer (52).

2. the apparatus of claim 1 wherein the average fiber length (60) of said overlayer (51) and said underlayer (52) is two millimeters or less.

3. The apparatus of claim 1 wherein the average fiber length (70) of said undulating midstratum layer (53) is five millimeters or more.

4. The apparatus of claim 4 wherein said air cells (55) are formed between said overlayer (51) and said underlayer (52) by way of said undulating midstratum layer (53) such that the overall weight of a panel (50) is reduced while improving panel strength via the spring-like effect of said midstratum layer and by the relatively longer fiber lengths (70) contained in said midstratum layer.

* * * * *